KOLMAN & SCHNEIDER.
Coffee Roaster.
No. 18,710.
Patented Nov. 24, 1857.
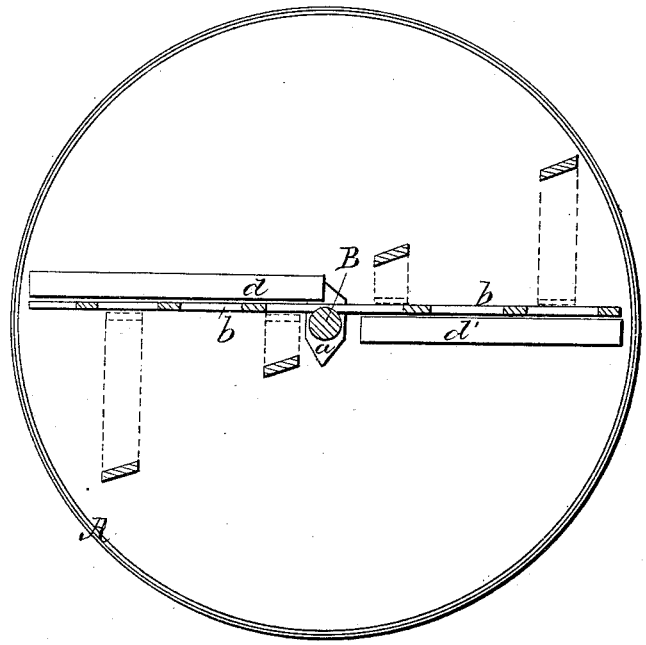
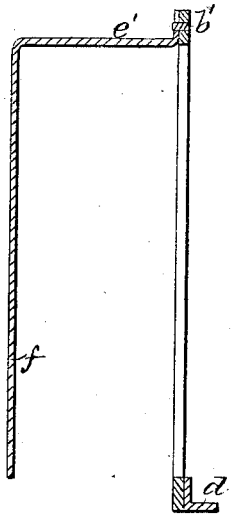
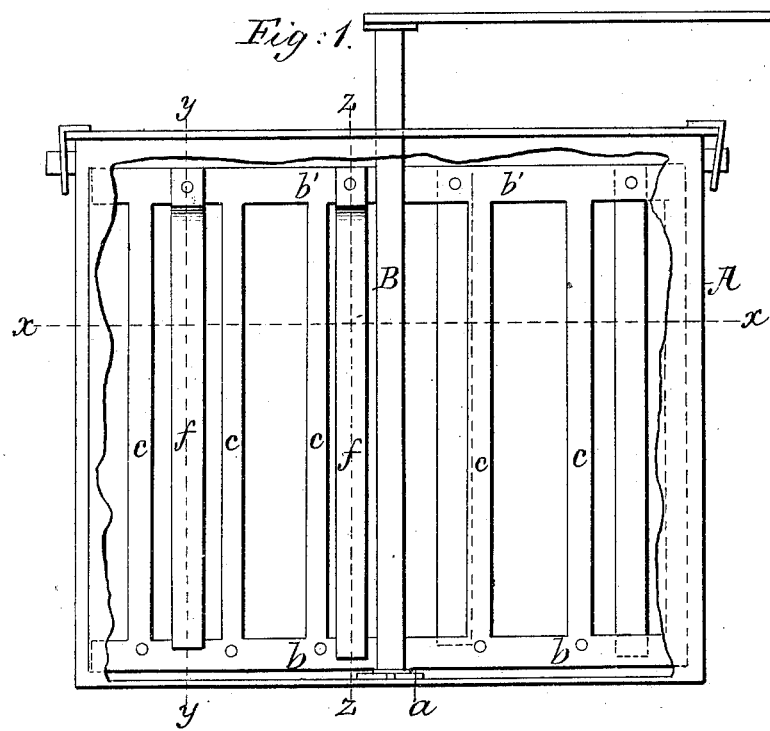
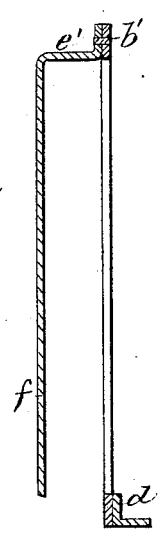

UNITED STATES PATENT OFFICE.

ELIAS SCHNEIDER AND A. KOLMAN, OF NEW TRIPOLI, PENNSYLVANIA.

COFFEE-ROASTER.

Specification of Letters Patent No. 18,710, dated November 24, 1857.

*To all whom it may concern:*

Be it known that we, ELIAS SCHNEIDER and A. KOLMAN, of New Tripoli, in the county of Lehigh and State of Pennsylvania, have invented new and useful Improvements in Coffee-Roasters; and we do hereby declare that the following is a full, clear, and exact description of the construction and operation of the same, reference being had to the annexed drawing, forming part of this specification, in which—

Figure 1 is a side elevation of the roaster with part of cylinder broken out to show the agitator. Fig. 2 is a horizontal section on line $x\ x$. Fig. 3 is a section on line $y, y$. Fig. 4 is a section on line $z\ z$.

Similar characters of reference in the several figures denote the same part.

The nature of our invention consists in the peculiar construction of agitator, as will be hereinafter set forth.

To enable others skilled in the art to make and use our invention, we will proceed to describe its construction and operation.

In the drawing A is a vessel, containing the coffee, said vessel having the form of a rght cylinder.

B is a perpendicular shaft, stepped at $a$ in the bottom of the vessel. Fastened to the shaft are the horizontal cross pieces $b\ b'$, connected together by a series of ribs $c$. Attached to piece $b$ are the scrapers $d\ d'$, situated on opposite sides of said piece.

$e\ e'$ are horizontal arms attached to the piece $b'$, and are bent, forming the pendants $f\ f$, as shown in drawing. There are two sets of arms, $e\ e'$, and are fastened on opposite sides of piece $b'$, the several parts being arranged as set forth in the drawing.

The operation of the roaster is as follows:—By means of crank D, the agitator is made to revolve in direction of arrow, when the several parts effectually agitate the coffee, the pendants of arms $e$ agitating and removing the coffee from the sides of the vessel, the pendants of short arms $e'$ serving to agitate the coffee near the center of the vessel, the scrapers $d\ d'$ removing the coffee from the bottom of the vessel, thereby preventing the same from scorching.

What we claim as our invention and desire to secure by Letters Patent, is—

The combination of the agitator as described with the vertical cylinder containing it, as and for the purposes herein specified.

In testimony whereof, we have hereunto signed our names before two subscribing witnesses.

ELIAS SCHNEIDER.
    A. KOLMAN.

Witnesses:
 AARON S. MILLER,
 SAMUEL J. KISTLER.